US010884597B2

(12) United States Patent
Resudek

(10) Patent No.: US 10,884,597 B2
(45) Date of Patent: Jan. 5, 2021

(54) USER INTERFACE CUSTOMIZATION BASED ON FACIAL RECOGNITION

(71) Applicant: PAYPAL, INC., San Jose, CA (US)

(72) Inventor: Timothy Resudek, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 208 days.

(21) Appl. No.: 15/786,519

(22) Filed: Oct. 17, 2017

(65) Prior Publication Data

US 2019/0114060 A1 Apr. 18, 2019

(51) Int. Cl.
| G06F 3/048 | (2013.01) |
| G06F 3/0484 | (2013.01) |
| G06K 9/00 | (2006.01) |
| G06K 9/62 | (2006.01) |
| G06F 21/32 | (2013.01) |
| G06F 21/62 | (2013.01) |
| G06F 9/451 | (2018.01) |

(52) U.S. Cl.
CPC .......... *G06F 3/04847* (2013.01); *G06F 21/32* (2013.01); *G06K 9/00228* (2013.01); *G06K 9/00288* (2013.01); *G06K 9/6201* (2013.01); *G06F 9/451* (2018.02); *G06F 21/6245* (2013.01); *G06K 9/00268* (2013.01); *G06K 2009/00322* (2013.01)

(58) Field of Classification Search
CPC .......... G06F 3/00; G06F 3/048; G06F 3/0484; G06F 3/04847; G06F 21/32; G06F 21/6201; G06F 21/6245; G06K 9/00; G06K 9/00228; G06K 9/62; G06K 9/6201

See application file for complete search history.

(56) References Cited

U.S. PATENT DOCUMENTS

| 8,358,321 | B1 * | 1/2013 | Weidner | G09G 5/00 345/619 |
| 8,788,977 | B2 * | 7/2014 | Bezos | G06F 1/1626 715/863 |
| 10,033,973 | B1 * | 7/2018 | Shen | H04N 7/186 |
| 10,126,927 | B1 * | 11/2018 | Fieldman | G06F 3/147 |
| 2008/0297586 | A1 * | 12/2008 | Kurtz | H04N 7/147 348/14.08 |
| 2013/0160141 | A1 * | 6/2013 | Tseng | G06F 21/6245 726/28 |
| 2014/0028542 | A1 * | 1/2014 | Lovitt | G06F 3/017 345/156 |

(Continued)

*Primary Examiner* — Xiomara L Bautista
(74) *Attorney, Agent, or Firm* — Haynes and Boone, LLP

(57) ABSTRACT

There are provided systems and methods for user interface customization based on facial recognition. A computing device, such as a mobile smart phone, may include one or more imaging components, such as a camera. The camera may capture still or video media data of a user during use of the device. Using the media data, the user may be recognized or may be identified as an unknown user, such as an unauthorized user. If the user corresponds to a different user from an administrator or owner of the device, the device may utilize an identity, known or unknown, for the user to determine what user interface actions and data the user is allowed to view on the device. The device may restrict particular user interface data from viewing, and may also limit the user from interacting with particular interface elements or initiating interface processes or navigation.

20 Claims, 5 Drawing Sheets

(56) References Cited

U.S. PATENT DOCUMENTS

| | | | | |
|---|---|---|---|---|
| 2014/0282956 A1* | 9/2014 | Kennedy | ............... | H04L 63/08 726/7 |
| 2014/0337930 A1* | 11/2014 | Hoyos | ............... | H04L 63/10 726/4 |
| 2015/0109428 A1* | 4/2015 | Mechaley, Jr. | ............... | G06K 9/00288 348/77 |
| 2016/0085950 A1* | 3/2016 | Chen | ............... | G06F 21/32 726/28 |
| 2016/0110537 A1* | 4/2016 | Harrison | ............... | G06F 16/951 705/14.66 |
| 2017/0017834 A1* | 1/2017 | Sabitov | ............... | G06K 9/00288 |
| 2018/0232563 A1* | 8/2018 | Albadawi | ............... | A61B 5/1113 |
| 2018/0359425 A1* | 12/2018 | Hiro | ............... | H04N 5/232935 |
| 2019/0075236 A1* | 3/2019 | Cheung | ............... | G06K 9/00295 |

\* cited by examiner

USER INTERFACE CUSTOMIZATION BASED ON FACIAL RECOGNITION

TECHNICAL FIELD

The present application generally relates to user interface customization and device operation security and more specifically to utilizing facial recognition of a user in an image to secure user interface elements and/or configure a display instance of a user interface based on an identity of the user.

BACKGROUND

Computing devices may display user interfaces (UIs) to users for one or more applications, including through one or more graphical user interface(s) that allow for interaction with an operating system and/or one or more applications in order to utilize application processes in an easy and intuitive manner. These UIs allow for users to execute applications, select and use processes in applications, view data, and perform other computing functions. UIs generally display all available data and functions for that specific UI, which may correspond to application data and functions. Certain UIs may be set with restrictions on use that require authentication to utilize the features of the UI, for example, login UIs that navigate to secure information, accounts, or other protected data. However, a user is required to set these restrictions, and they may be enforced uniformly across all users, creating a burden for the owner of the device to repeatedly perform authentication. In contrast, without utilizing these restrictions, the owner risks that potentially sensitive data is released to or viewed by other users. Thus, current computing systems either require time consuming authentication processes to display UI data to users, or risk security issues in UI data presentation by not correctly filtering and redacting data or limiting UI navigation and/or process execution.

Figure 1:
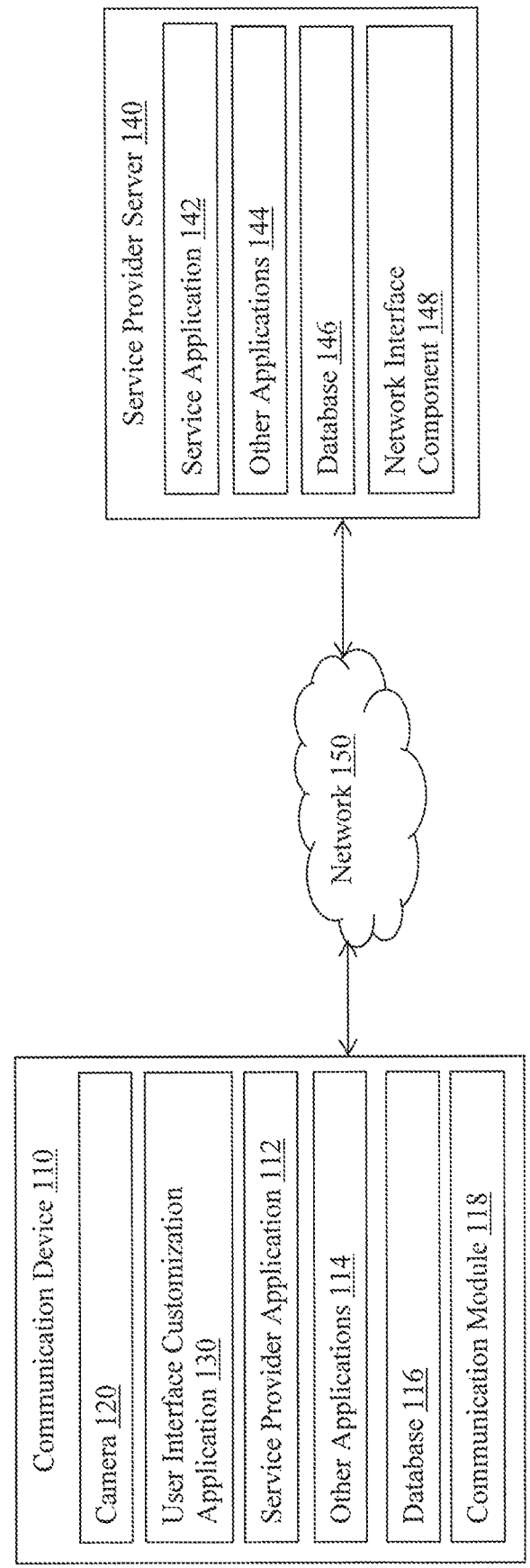
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for user interface (UI) (also referred to herein as graphical UI or GUI) customization based on facial recognition. Systems suitable for practicing methods of the present disclosure are also provided.

Computing devices may include functionality to capture images using a camera or other media capture device associated with the device. For example, digital cameras, mobile smart phones, tablet computers, digital video recorders, gaming systems including mobile gaming systems, and other types electronic devices are capable of capturing media of a user. Media captured of a user may correspond to still images, videos, and/or other visual content of a user. Thus, although the terms "image," "video," or the like may be used throughout, it is understood that other forms of image data may also be captured, including infrared image data, x-ray data, or other types of image data that may be detected by an imaging device, such as a camera, infrared sensor, photodetector, etc. Media data of a user may be captured of the user during use of the computing device. For example, a camera of a computing device may capture an image of a user as the user is handed the device, attempts to use or interact with the device (e.g., provides input to the device), or otherwise views or utilizes the device. A forward facing camera or other imaging system of a mobile device, tablet computer, or personal computer may capture the user as the user attempts to login, access, or use the device, whereas other types of affiliated imaging systems may be configured to capture an image of the user as the user uses the device. The camera may be mounted in such a position to capture the user using the device, such as a "selfie" or personal picture of a user captured with a forward facing camera of a mobile phone. Thus, when the user picks up, is handed, or attempts to utilize a device, the device may capture image data.

In this regard, the image data, such as a still image or video, may include a representation, portrayal, or likeness of a user, such as facial data and/or body data that captures all or part of the user's face and/or body at the time of capturing the image. Additionally, in other embodiments, audio data, or audiovisual data, may also be captured that includes the user's voice. For example, a user may capture the user's likeness (e.g., a "selfie") when photographing or videotaping the user, which may be intentional (e.g., selecting an image recording application and requesting the application record the user's image) or performed automatically on detection of the use of the device by the user. Where the image is captured automatically, without user input and in response to the use by the user, the communication device may automatically record or otherwise capture/process the images, for example, by a process executing on the communication device and/or by a request from device/server of a service provider over a network connection with the communication device.

The image data may correspond to a single image, or may be part of a plurality of images, such as a video having multiple frames or still images. In various embodiments, additional information may be captured of the user, including sounds and voice cues, background or ambient noise, biometrics (e.g., fingerprint, heart rate, retinal scan), and/or biometric cues (e.g., pulse or heart rate change, blood pressure change, pupil dilation or contraction, breath change, etc.). Such additional information may be captured by a communication device, such as a mobile phone, or a connected device, such as a fitness tracker, and may be associated with the captured image(s) and/or video(s). Thus, the user's representation, portrayal, or likeness in an image may include some physical representation or portrayal of the user that may be used to identify the user including various physical and visual traits of the user (e.g., face, body, etc.), as well as audio of the user, biometrics of the user, and similar user specific traits.

Facial and/or body data in the captured media (e.g., digital media, such as a digital image or digital video) may be used to identify a user using image processing techniques discussed herein, including facial recognition. An image processing and/or facial recognition process may be used to identify users in images and verify their identity using comparison of the captured media data to other images/video and/or analysis of the media data using known user facial/body features, landmarks, or other signifying data points to determine an identity of the user. For example, image data may be captured by a camera of a device as discussed herein, where the device executes an application to process the image data. In other embodiments, the application may instead be one or more subroutines in one or more libraries shared between multiple applications that may execute in response to detection of a use of the device by a user and/or a transfer of possession or utilization of the device between users (e.g., when a first user, who may own or be an administrator of the device hands the device to another user). The application (or subroutines as applicable) may then proceed by extracting facial feature data, including an overall facial structure and any particular facial features of note.

The facial structure may include distances between eyes, a nose in the image, a mouth, cheekbones, ears if present and visible, and/or a jawline. Thus, a distance between the eyes may be extracted from the image data, as well as depth or width of eyes and associate eye features, such as eye sockets. A width and/or length of a nose may be extracted, as well as a size of a nose relative to a face. The shape, height, and/or placement of cheekbones and a jawline, including length of the jawline may also be extracted. Other data points may also be determined in an image, which may include other facial features of note (e.g., any identifying features, such as moles, lip shape, facial hair, etc.) and/or high/low nodes in the image.

Additionally, body features may also be analyzed, include height, limb length, waist measurements, etc. The facial/body features may also be analyzed using non-visible electromagnetic radiation, such as infrared imaging, which may also be used to extract identifying data. Thus, identifying nodes and points in the image data may be extracted to determine a set of identifying data for the image data, which may be used to determine an identity of a user represented in the image data. While an image may be limited to a single still image having the facial and/or body representation used to determine an identity of a user, a video may include a plurality of different facial data and/or body representations that may further be used to determine the identity, and may therefore be captured. Additionally, while the user may be identified in the image data, the image processing by the application may also identify user characteristics, such as gender, age, nationality, or other user characteristic that may require specific features, languages, or other information when using the computing device.

Thus, the computing device (or service provider where the image processing is not provided on the device but over a network based on a connection between the device and the service provider) may receive the image or other image data, which may be processed to determine an identity of the user. Once the image is processed using facial, body, and/or object recognition, the aforementioned identifying data set for the image data may be extracted. The image data may be compared to other images, videos, and/or stored data of previously extracted identifying data. For example, the facial features and other identifying data of the user in the image may be compared through feature comparison to other examples of user images for known user (e.g., having identification information and/or identifiers that can be used to identifying the user) and/or stored images of the known users. To minimize the amount of images for comparison, a location of the user may be determined through GPS or other location determining devices associated with the image capture, including a GPS device within a smart phone capturing the image. The system may then compare the captured image with a subset of stored known images, where the subset comprises stored images of users known or expected to be at the location of the image capture.

Using such comparison, facial recognition, and/or other image processing process or features, the communication device and/or service provider may identify the user. Thus, the communication device and/or service may have a database with stored user identifying information from previous image extracts and/or stored images of the known users to identify the user, along with location information associated with the stored images. The user may then be identified through the stored information by the communication device and/or service provider and the facial and/or body features extracted from the image/video of the user. The image and/or video data may be received with additional captured data for the user by the user's communication device or another associated device, including sound data, biometric data, and/or other user information at the time of capturing the image/video, which may further be used to identify the user. For example, sound data may be processed using voice recognition to identify the user and/or verify an identity, while a biometric, such as a fingerprint, may also be used to determine an identity (e.g., through comparison to a database of known user biometrics for one or more users). A change in heart rate or pupil size, user sounds and/or ambient sounds, or other information may be used to determine the user based on known information for the user. Where the image data may have multiple users identified in the image data or additional information is required to identify the user in the image data using the device, the user may be queried to provide the additional information. For example, the user may be required to identify themselves in the image (e.g., select a portion of the image portraying the user when output by the device on an output display, which may correspond to a display screen showing captured camera input) or may be required to provide a name or identifier, or select from a list of names/identifiers for multiple users identified in the image.

Once the user is identified, the computing device may then access, retrieve, or process one or more parameters, such as authorizations and/or restrictions on usage of the device by a user captured in the image data, and more specifically, on using, viewing, or interacting with a UI output by the device by the user, such as an instance of a graphical user interface (GUI) displayed on a display screen component of the device. Parameters may correspond to what data is displayed in one or more instances, displays, or outputs of the UI, as well as the available processes, navigation, or other executable actions that a user can take while viewing and interacting with the UI. Parameters may also correspond to conditions of the UI for using, viewing, or interacting with the UI by the user detected in the image, for example, the state of appearance or output of the UI dependent on the user detected in the image data. In this regard, a parameter may correspond to a particular output "look," display, or other output (e.g., audio output for an audio UI) for a UI that the user is viewing at the time of usage by the user (e.g., the time of capturing the image data) or requests to view while using the device. A restriction parameter may limit UI data output, for example, by preventing or restricting viewing the UI or certain data within the UI (e.g., text including financial information or authentication/login information, images or video, etc.). The restriction parameter may also limit navigation by the user within the UI or to another UI, such as an operating system GUI, a UI of another application, etc. The restriction parameter may also lock UI processes and/or features from execution by the user, data input by the user, and/or request for input/execution, for example, by preventing the user from selecting the process and requesting the process be executed.

The restriction may be implemented at an application level, so that the restriction is asserted in the application, or may be utilized at an operating system level to affect and/or restrict use, navigation, and/or access to processes on an operating system level and across multiple applications. The restriction may also restrict particular data output and/or process execution/usage within a larger output or process. For example, only a single image may be displayed for an image capture application, where other images may not be displayed or capable to be navigated to. Similarly, financial transactions may be limited to showing a previous transaction, but blurring or redacting sensitive financial information, past transactions, account balances, etc. The restrictions may also be implemented in a logic process, that determines the potential data displayed in the UI and/or actions that user may take in the UI, which may be limited based on the identified user. For example, the application or subroutine utilizing and implementing the UI restriction parameter may determine the potentially requested or desired data output and/or executable tasks, and may limit the content based on permission and/or trustworthiness of the identified user. The trustworthiness may be set by an administrator user of the computing device, or may be determined based on past user actions, allowances, and/or user interactions (including associated that the identified user may have with an administrator user for the device, such as social networking connections, length of connection, previous transactions, identified connections (e.g., spouse, family, etc.), or other connection). The logic process may also be location based and dependent on the device's and user's location, for example, by restricting specific information in a merchant retail storefront, in a public area, etc. An allowance parameter may unlock generally or specifically restricted data, including the aforementioned data output, navigation, and/or UI processes/features. In this regard, the allowance parameter may allow the identified user to view UI data normally not output, or only accessible to certain users, or may allow the user to perform certain UI processes or execute certain tasks that are restricted or only allowed by specific users.

Other types of parameters may instead change the appearance of the UI, which may be dependent on the user's characteristics or information, such as age, gender, nationality, etc. For example, when identifying younger users, the UI parameter may restrict access to particular device functions, such as transaction processing and payment applications, media purchase, and/or sub-processes or media available in applications (e.g., prevent searching/playback of media, such as television, above a certain maturity rating or age threshold). Application processes may be tailored to a specific gender, for example, a change of gender in a fitness and/or diet tracker application may affect recommended exercise and/or dietary guidance. Additionally, a determined nationality may switch or inquire as to whether the user would like to switch to another language. Thus, other user information extracted from the image data may also be used to determine a parameter that may affect output of the UI.

These parameters for UI display may be user specific, or may be specific to a type of user. The parameters may be linked to an identity, where the identity is known to the computing device or available from a network resource available to the device. In this regard, the identity of the user may be previously established with the system. For example, an administrator or owner user may request that an identity be set with the computing device for using, viewing, and/or interacting with one or more UIs by the administrator user and/or one or more other users, and/or permissions, restrictions, or other parameters for use of the UI set for the user or the other user(s). Thus, during establishment of the identity in media data, the administrator user may provide image (or video) data, and a facial recognition or other image processing process may be utilized on the received image data to determine facial features and/or image data points that may be used to identify the user (or the other user(s)) in the image data. The user may then register the data used to identify the user (or the other user(s)) in the image data with the communication device and/or service provider. The provided data may be processed using the image processing to extract reference data points, nodes, or other information that correspond to a user's representation or portrayal in the provided data. These data points may then be stored to a database, which may then be used for image processing, as discussed herein, to identify a user in image data when the user uses the device. The administrator user or other user may set an identity with the data points, such as a name or other identifier that can be used to identify the user.

In other embodiments, the image data, videos, or other media data may be stored to the device from media data that has been previously captured (e.g., in an image library) or may be available from data retrieved or accessible through an online resource, including social networking platforms, media sharing resources, and/or email/messaging services. Media data stored to a computing device may include a library of images/videos or data stored to and/or accessible by one or more applications on the device, which may be processed to determine reference data points used for facial recognition or other image processing. Media available from an online resource may be similarly processed, and the extracted reference data points may be stored to the computing device or an online database accessible by the computing device. Additionally, the processed or reference media data may include identifying metadata for the identified user, including tags of the user with a user identifier, storage to the user's online account, or other associated metadata that allows the extracted reference data points to be associated with an identity.

When establishing an identity for one or more users in image data (e.g., the data points or nodes used to identify a user in image data captured when the user uses the computing device discussed herein), the identity may also be set with one or more of the aforementioned parameters. For example, the administrator may request that reference data points or nodes for facial recognition or other image processing be extracted from the stored media data and/or media data available from a networked resource or other available remote database. Once extracted, the administrator user of the computing device may request that parameters on UI usage and/or output be established for the reference data points and/or identity for the reference data points. The parameters may correspond to one or more of the restrictions, authorizations, and/or changes in UI presentation data, for example, the output data and/or available processes for execution or features for viewing/executing within the UI. Thus, the identity and/or reference points for image processing may further be set with a parameter for usage of a UI when the user associated with the identity/reference points uses the device. The parameters for UI output and/or usage may be stored to the device, or may be transmitted to a service provider for use by the device using a network connection with the service provider's server and/or cloud computing system.

In further embodiments, the administrator user may instead set standard UI usage/presentation parameters, which may be used with unknown or guest users not recognized in image data and/or users having certain identifiable user characteristics (e.g., age, gender, etc.). For example, the administrator user may require that guest users may only view a single UI displayed, and may not navigate to other UIs, processes, tasks, or applications. The administrator user may establish that the guest user may only view certain data, such as the last captured image or video in a media capture application associated with a camera, or may only view the details for a last transaction conducted in a transaction processing and/or payment application. The administrator may require that the guest may also only enter data into a payment, transfer, or transaction processing process of the application, but may not execute the process until authorization is entered by the administrator or other authorized user, for example, when the other user is no longer using the device and/or the administrator is detected as using the device through new image data. The administrator may prevent display of all other data, including sensitive financial data from the UI. Additionally, the administrator user may require that unidentified users (or identified users) with specific characteristics identified by the computing device may instead receive an output of the UI dependent on their characteristics, such as larger icons and/or touch screen interactive elements for young or old persons, limitations of navigation and/or UI process usage dependent on age, etc.

Thus, when image data of the user is captured through an image capture device (e.g., a mobile device's forward facing camera that captures images of a person using the device, such as a "selfie"), the identity may be determined using the previously established facial recognition data and image processing data points. As the user uses the computing device and is identified in the image data by the device, the application or subroutines may determine a UI that is being displayed or requested to be displayed, and may determine the data that is output in the UI, including the displayed data, available processes/features, and/or navigations. Thus, when identifying the user, the UI presentation, data output, and/or feature usage of the device at the time of use by the user may be associated with the identification of the user. For example, the identification of the user using the device may be associated with content that the user is viewing or requesting to view at the time (e.g., video watching, image viewing, etc.), an application UI presentation or UI presentation request by the user (e.g., online shopping, purchasing/payment processing, web browsing, social networking, microblogging, messaging, survey taking, online group activities including game playing and/or movie watching, etc.), or other requested output of a UI having data and executable UI processes may be determined and associated with the identification. The required data for output of the UI being viewed or requested for viewing may be determined and may be processed using the parameters for UI display.

Based on the determined UI being displayed or requested to be displayed, and the UI display parameters determined for the user identified in captured media data at the time of UI display, the computing device may configure, customize, or generate an instance or display of the UI particular to those UI display parameters. The device may change an appearance or output of the UI prior to display/output based on the UI display parameters to restrict, allow, or change one or more UI elements. The UI elements may correspond to displayed or output data, including text, images, or videos, as well as navigation processes and executable tasks. Thus, a restriction parameter may prevent, blur out, or make inaccessible one or more UI elements, an authorization parameter may allow, make visible, or make accessible one or more UI elements, while a change parameter may change the appearance of one or more UI elements, including size, color, shape, language, etc. Once data for the UI is processed with the parameter to generate the instance or display of the UI customized for the user and the user's parameter, the UI may then be displayed by the computing device.

The UI presented to the user may also be altered, unlocked, or otherwise changed during presentation of the UI to the user. For example, the user may enter a code, authentication credentials, a login, or other identifying data that allows the UI to be unlocked so additional data and/or executable UI processes may be accessed. The code may be provided by the user, or the owner/administrator of the device during the use by the user. The UI may also change appearance based in a change in detected users using the device, for example, when the first user detected in the image data transfers control of the device to a second user, who is then detected in new or second image data. The computing device may re-determine an identity and associated parameters for the second user, and the UI may be re-processed to display the UI according to the new parameters.

After determination of the customized UI based on the UI display parameters, the computing device may also transmit the image data captured of the user using the device to another device or server, or may store the data locally for later use and presentation. The image data may be transmitted and/or stored to provide other users, such as the administrator or owner user of the device, with the image data to confirm an identity of the user using the device and check for fraudulent usage. The device may also record data of actions taken or requested by the user during the use of the device and interaction with the customized UI to determine whether the user attempted to act or acted fraudulently or maliciously. In various embodiments, the image data may also be transmitted and/or stored with location information of the user, which may be used to track where the device is used and if an unauthorized user is or was using the device. Thus, the owner/administrator user may be able to secure their device from use by other users and attempt to recover the device if misplaced or lost and the other users attempt to use the device without authorization.

Thus, on detection of the user and determination of the identity of the user through the image data, the identity for the user may be retrieved or determined. The user may also be identified through entered authentication credentials, entry of a name or identifier to an application, or other identification and/or authentication process performed by the user using the device. This allows the computing device to determine parameters for display of a UI, and present the UI with minimal user input to change the UI. The processes described herein therefore improve digital security of data displayed within UIs, and prevent unauthorized usage and/or execution of processes within UIs. Thus, issues and problems inherent in a device's UI output may be remedied by providing UI customization based on facial recognition of a user at the time the user is using the device. Such processes therefore improve device UI security and allow for faster UI presentation without requiring multiple user inputs to prevent release of secure data and/or unauthorized device usage.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a communication device 110 and a service provider server 140 in communication over a network 150. The user (not shown) may utilize communication device 110 to utilize the various features available for communication device 110, which may include processes and/or applications executed by communication device 110 for generation and display of UIs customized for particular users. Communication device 110 may include components to capture media data, such as images, videos, or other audio, visual, or audiovisual content, of a user when the user uses communication device 110 Communication device 110 may perform image processing to identify the user in the media data, and determine parameters set for output of one or more UIs that are established for the user. Communication device 110 may then process the parameters with one or more UIs displayed or requested to be displayed during the use of communication device 110 by the user so that the UIs are customized based on the parameters. The customized UIs may then be output to the user using an output component of communication device 110. In certain embodiments, the action or process may also be processes by one or more features provided by service provider server 140.

Communication device 110 and service provider server 140 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

Communication device 110 may be implemented as a communication device that may utilize appropriate hardware and software configured for wired and/or wireless communication with service provider server 140. For example, in one embodiment, communication device 110 may be implemented as a personal computer (PC), telephonic device, a smart phone, laptop/tablet computer, wristwatch with appropriate computer hardware resources, eyeglasses with appropriate computer hardware (e.g. GOOGLE GLASS®), other type of wearable computing device, and/or other types of computing devices capable of transmitting and/or receiving data. Communication device 110 may include or be associated with a camera 120, which may be physical contained, embedded, attached to, or included with communication device 110. In certain embodiments, camera 120 may be external to communication device 110 and provide input data to communication device 110 (e.g., through a wired connection or wireless connection over short range wireless communications or a network). Although only one communication device is shown, a plurality of communication devices may function similarly.

Communication device 110 of FIG. 1 contains camera 120, a user interface customization application 130, a service provider application 112, other applications 114, a database 116, and a communication module 118. User interface customization application 130, service provider application 112, and other applications 114 may correspond to executable processes, procedures, and/or applications with associated hardware. In other embodiments, communication device 110 may include additional or different modules having specialized hardware and/or software as required.

Camera 120 corresponds to an optical device of communication device 110 enabling a user associated with communication device 110 to capture or record images, including still and/or video images. Camera 120 may correspond to a digital camera on communication device 110 (e.g., incorporated in communication device 110 such as a mobile phone's camera including a digital camera for a mobile phone in a traditional camera orientation and/or a forward facing camera orientation that captures the user as the user uses or views a display screen of the mobile phone) or associated with communication device 110 (e.g., connected to communication device 110 but incorporated within a body or structure of communication device 110), or may more generally correspond to any device capable of capturing or recording an image, video, or other digital media data with the capability to capture a representation or portrayal of a user, including infrared imaging or other types imaging devices. Camera 120 may include various features, such as zoom, flash, focus correction, shutter speed controls, or other various features usable to capture one or more images or videos of the user and/or other users or objects. Camera 120 may include other media capture components, including a microphone to capture audio data and/or a touch element or screen that captures a biometric.

Camera 120 may further display a preview and/or captured image to the user through another device of communication device 110, such as a viewfinder, screen (e.g., mobile phone touch screen, tablet touch screen, and/or personal computer monitor), or other display. Camera 120 may interface with one or more applications of communication device 110 to capture media or image data, such as images/videos, which may be used with a facial recognition or image processing process to determine an identity of a user in the captured data. Camera 120 may also be used to capture image data that is processed to determine reference data points or nodes for use in future facial recognition processes. User interface customization application 130 may therefore use camera 120 to capture media data, which may be processed to determine reference image data for facial recognition processes of user interface customization application 130, or may be processed with reference image data to determine an identity of a user.

User interface customization application 130 may include one or more processes to utilize devices of communication device 110 to receive media data from camera 120 and process the image data, for example, to set reference data for identification of a user in an image, determine an identity of a user in an image using the reference data to customize output of a UI, and/or generate or cause output of the customized UI. In this regard, user interface customization application 130 may correspond to specialized hardware and/or software utilized by communication device 110 to first request and/or receive image data or other media data from camera 120. The data may be requested and/or received in response to detecting that a user is using communication device 110, or another user begins using communication device 110, such as a switch in possession between users. Communication device 110 may determine the switch in possession through camera 120, or another input component, such as a biometric sensor or pressure sensor. For example, camera 120 may capture media data of another user, or no longer detect/capture the first user using the device before the change in possession. A touch screen interface or other input component may capture a fingerprint that corresponds to the other user that take possession/control of the device. Once the change in possession is detected, user interface customization application 130 may then request and/or receive image data for processing to customize one or more user interfaces.

Once the image data is received, user interface customization application 130 may process the image data to determine an identity of the user captured in the image using their representation or portrayal in the image. User interface customization application 130 may process the image data using image processing and/or facial recognition. Image processing/facial recognition may be performed by extracting the data points, features, nodes, or nodal areas of interest from the image data and comparing the extracted data to stored reference data and/or images. User interface customization application 130 may access the reference images, videos, and/or data points/nodes from database 116 of communication device 110 where the reference data is stored locally, or may request and/or retrieve the information over network 150 from another resource, such service provider server 140. User interface customization application 130 may then determine similarities between the extracted image data from the received image data and the reference data to determine one or more matches. Where there are multiple matches, each match may be scored, and a highest match may be used. The identity of the user may therefore be determined using the facial recognition process by user interface customization application 130. Additionally, user interface customization application 130 may request confirmation from the user using an output component of communication device 110 where necessary to confirm the identity of the user. User interface customization application 130 may also determine user characteristics for the user.

Using the identity of the user, user interface customization application 130 may access or determine any UI customization parameters, including restrictions, allowances, and/or changes on output of UI elements. The UI customization parameters may restrict data presentation, task/feature usage, and/or navigation within the UI, or may allow data presentation, task/feature usage, and/or navigation within the UI that is normally restricted or restricted from the previous user. The UI customization parameters may also change an appearance and/or output of a UI element or feature, such as a size, color, playback feature, volume, etc. of the UI element. The UI customization parameters may then be processed with a UI being displayed during the use of communication device 110 by the user, or a UI requested to be displayed during the use, which may alter, customize, and/or change the appears, displayed data, navigation, and/or interactive tasks or features of the UI. User interface customization application 130 may customize the appearance of a UI output by service provider application 112. For example, the user utilizing communication device 110 may view or request to view one or more UIs of service provider application 112 that are output during the execution of service provider application 112. User interface customization application 130 may therefore interact with service provider application 112 to determine the UI for display by service provider application 112, and customizing the appearance of the UI based on the UI customization parameters.

In other embodiments, user interface customization application 130 may interact with one or more of other applications 114 to customize the appearance of one or more UIs displayed to the user during the user's use of communication device 110. Thus, user interface customization application 130 may increase security in use of one or more UIs of service provider application 112. User interface customization application 130 may also transmit image data of a user using the device to service provider server 140 or another device/server based on the identity, the UI customization, and/or requested UI displays or interactions for use in fraud detection and/or security. For example, the image data may be transmitted when the user utilizes communication device 110 to provide information on the user using communication device 110, which may also be transmitted with a current location detected by communication device 110 (e.g., GPS data/coordinates) for use in location detection.

Service provider application 112 may correspond to one or more processes to execute software modules and associated components of communication device 110 to provide one or more features associated with service provider server 140. In this regard, service provider application 112 may correspond to specialized hardware and/or software utilized by communication device 110 to provide messaging applications, telephonic applications, social networking applications, fitness trackers and applications, media sharing or viewing applications, imaging application (e.g., a camera and associate application), microblogging applications, web browsing applications, and/or other types of applications.

Service provider application 112 may also be used to output a customized UI, or an instance or a display of a general UI of service provider application 112, based on processes executed by user interface customization application 130. Output of a UI by service provider application 112 may include output of UI elements that are restricted, allowed, or changed based on UI customization parameters determined by user interface customization application 130 using an identity of a user using communication device 110. For example, the UI customized by user interface customization application 130 may allow or restrict display of data, usage of a UI feature or process, entry of data to the UI, and/or navigation within the UI or to another UI, process, or application. Where service provider application 112 corresponds to a transaction processing and/or payment application, service provider application 112 may include one or more UIs that display sensitive financial information, including payment/credit/debit card numbers, bank account information, routing numbers, account balances, payments and/or credits, transfers, transaction histories, personal user information including name/address/social security, or other sensitive information. Thus, user interface customization application 130 may customize appearance of such UIs of service provider application 112 to blur or redact the sensitive information when a different user from the user logged in to service provider application 112, owning communication device 110, and/or utilizing service provider application 112 views a display component of communication device 110. The data may be redacted so the information is not shown when a different or unauthorized user is detected by camera 120 and user interface application 130, where the identity and/or restriction parameter is associated with detection of the different user.

User interface customization application 130 may also determine what information may be required to be displayed in the UI of service provider application 112, such as a last transaction or receipt showing a payment at a location of the user or to a user/merchant interacted to within a recent time (e.g., the last few minutes), and may display that information alone. Moreover, customization of the UI of service provider application 112 may also prevent access or utilization of certain processes, such as a balance transfer process, payment process, or other sensitive process. However, customization of the UI of service provider application 112 may also allow for data entry into a transfer or payment process, which may be location dependent (e.g., while communication device 110 is at a merchant location) so that the process may not be utilized by the other user detected in the image data, but the other user may enter transaction/payment process inputs and details for the authorized user of communication device 110 to confirm.

One or more of the aforementioned features and/or processes of user interface customization application 130 may be included within service provider application 112 or vice versa, for example, to provide their respective features within one application and/or application interface.

In various embodiments, communication device 110 includes other applications 114 as may be desired in particular embodiments to provide features to communication device 110. For example, other applications 114 may include security applications for implementing client-side security features, programmatic client applications for interfacing with appropriate application programming interfaces (APIs) over network 150, or other types of applications. Other applications 114 may also include email, texting, voice and IM applications that allow a user to send and receive emails, calls, texts, and other notifications through network 150. In various embodiments, other applications 114 may include financial applications, such as banking applications. Other applications 114 may also include other location detection applications, which may be used to determine a location for the user, such as a mapping, compass, and/or GPS application, which can include a specialized GPS receiver that obtains location information for communication device 110 and processes the location information to determine a location of communication device 110 and the user. Other applications may include transaction processing and/or merchant applications. Other applications 114 may include device interfaces and other display modules that may receive input from the user and/or output information to the user. For example, other applications 114 may contain software programs, executable by a processor, including a graphical user interface (GUI) configured to provide an interface to the user. Other applications 114 may therefore use devices of communication device 110, such as output device 110 capable of conveying information to users. In this regard, one or more UIs presented using one or more of other applications 114 may also be customized by user interface customization application 130 as discussed herein.

Communication device 110 may further include database 116 stored to a transitory and/or non-transitory memory of communication device 110, which may store various applications and data and be utilized during execution of various modules of communication device 110. Thus, database 116 may include, for example, identifiers such as operating system registry entries, cookies associated with service provider application 112 and/or other applications 114, identifiers associated with hardware of communication device 110, or other appropriate identifiers, such as identifiers used for payment/user/device authentication or identification, which may be communicated as identifying communication device 110 to service provider server 140. Database 116 may include reference image and identity determination information, such as reference images, videos, and/or reference data points for identification of one or more users extracted from the previous or available images, videos, or other media content. Such data may be stored with an identification of the associated user, such as a user identifier. Additionally, UI display and/or customization parameters associated with each identity, a plurality of identities, unknown users, and/or user characteristics may be stored to database 116.

Communication device 110 includes at least one communication module 118 adapted to communicate with service provider server 140. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 118 may communicate directly with nearby devices using short range communications, such as Bluetooth Low Energy, LTE Direct, WiFi, radio frequency, infrared, Bluetooth, and near field communications.

Service provider server 140 may be maintained, for example, by an online service provider, which may provide one or more services to users. In this regard, service provider server 140 includes one or more processing applications which may be configured to interact with communication device 110 and/or another device/server to facilitate UI customization based on identification of users using communication device 110 in captured image data, as well as provide other services. In one example, service provider server 140 may be provided by PAYPAL®, Inc. of San Jose, Calif., USA. However, in other embodiments, service provider server 140 may be maintained by or include another type of service provider.

Service provider server 140 of FIG. 1 includes a service application 152, other applications 154, a database 156, and a network interface component 158. Service application 152 and other applications 154 may correspond to executable processes, procedures, and/or applications with associated hardware. In other embodiments, service provider server 140 may include additional or different modules having specialized hardware and/or software as required.

Service application 152 may correspond to one or more processes to execute software modules and associated specialized hardware of service provider server 140 to provide a service to the user associated with communication device 110, which may include a service used for output of a notification determined by communication device 110. In this regard, service application 152 may correspond to specialized hardware and/or software to provide one or more of a messaging, telephonic, social networking, fitness tracking, media sharing or viewing, microblogging, web browsing, and/or other types of service. Service application 152 may also correspond to a server side transaction processing and/or payment application, which may interact with communication device 110, one or more accounts in database 156, and/or another entity's device or server to facilitate processing a transaction and/or making a payment or a transfer. Service application 152 may receive transaction processing data for the payment/transfer from a UI output by communication device 110, where the UI may be customized as discussed herein. Additionally, service application 152 may use and/or accrue media data, including images and/or videos of users, which service application 152 may provide to communication device 110 for image processing and facial feature extraction. Service application 152 may provide the image data with an identifier or other identification information, which may be used to identify a user associated with the image data in future captured images or videos by communication device 110. Service application 152 may also receive image data, as well as associated usage and/or location data, from communication device 110 for storage, which may be stored and/or provided to other devices for fraud detection.

In various embodiments, service provider server 140 includes other applications 154 as may be desired in particular embodiments to provide features to service provider server 140. For example, other applications 154 may include security applications for implementing server-side security features, programmatic client applications for interfacing with appropriate application programming interfaces (APIs) over network 150, or other types of applications. Other applications 154 may contain software programs, executable by a processor, including a graphical user interface (GUI), configured to provide an interface to the user when accessing service provider server 140, where the user or other users may interact with the GUI to more easily view and communicate information. The GUI may be customized by communication device 110 when output to a user through one or more applications of communication device 110. In various embodiments, other applications 154 may include connection and/or communication applications, which may be utilized to communicate information to over network 150.

Additionally, service provider server 140 includes database 156. Account and/or user data may be stored in database 156, which may include user information, such as name, address, birthdate, payment instruments/funding sources, additional user financial information, user preferences, and/or other desired user data. Users may link to their respective data through an account, user, merchant, and/or device identifier. Thus, when an identifier is transmitted to service provider server 140, e.g., from communication device 110, user data may be found. Database 156 may also store image data and associated metadata, such as identification information for one or more users.

In various embodiments, service provider server 140 includes at least one network interface component 158 adapted to communicate communication device 110 over network 150. In various embodiments, network interface component 158 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 150 may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by the various components of system 100.

Figure 2:
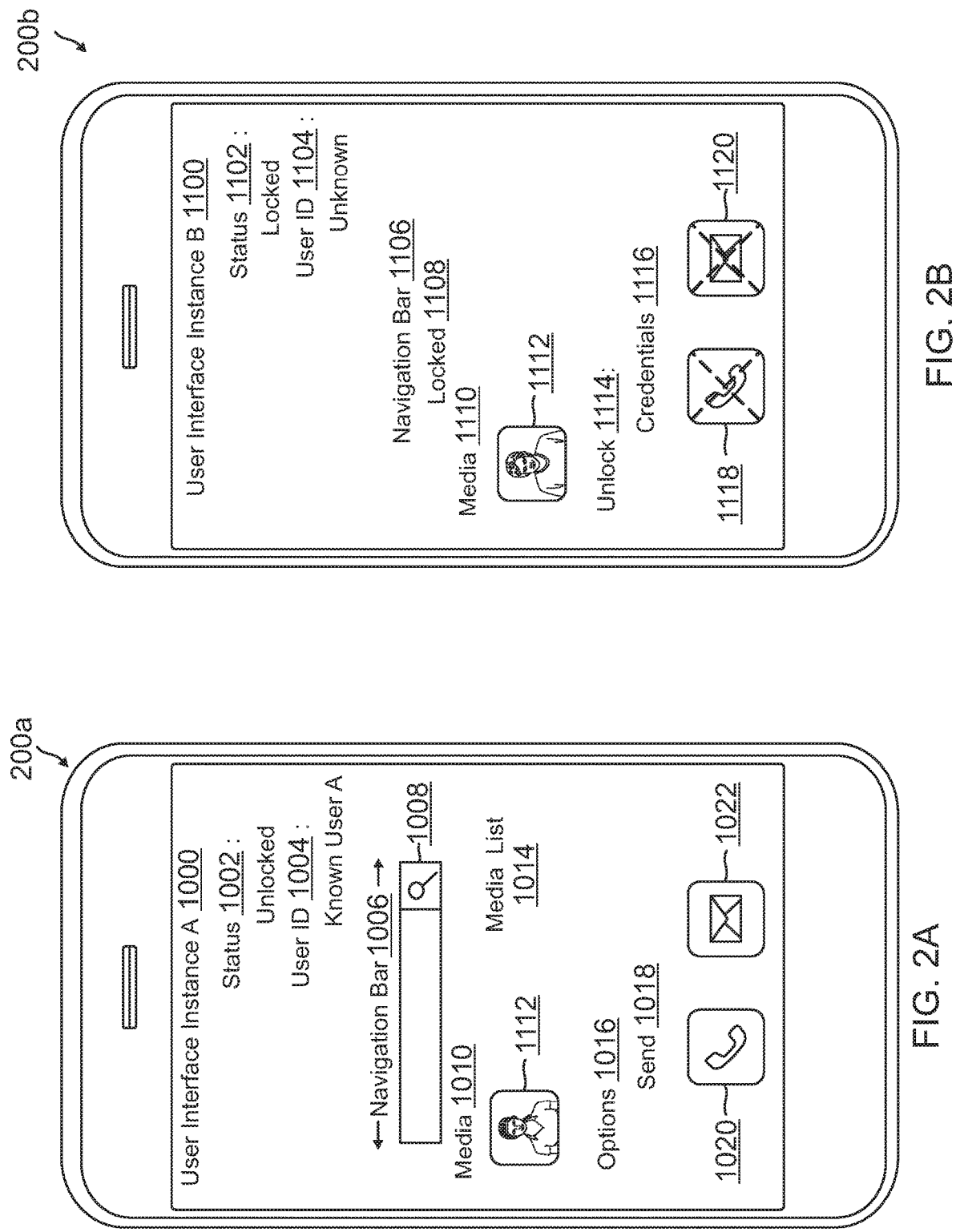
FIG. 2A is an exemplary graphical user interface (GUI) displaying data and processes for a first known user that is authorized to view all features of the GUI, according to an embodiment.
FIG. 2B is an exemplary graphical user interface (GUI) displaying data and processes for a second user that is restricted from viewing certain GUI features and data, according to an embodiment.

FIG. 2A is an exemplary graphical user interface (GUI) displaying data and processes for a first known user that is authorized to view all features or content of the GUI, according to an embodiment. Environment 200a of FIG. 2A includes a user interface instance A 1000 that may be displayed on a communication device, such as communication device 110, where user interface instance A 1000 displays a general instance or display of a UI without customization, for example, when a UI is unlocked for an authorized user of the communication device to see all data, features, and processes of user interface instance A 1000. In this regard, user interface instance A 1000 may be output using those features and processes provided by one or more of user interface customization application 130 and/or service provider application 112 of communication device 110 in system 100 of FIG. 1.

In user interface instance A 1000, the general or base UI may be displayed with all associated data, features, and/or executable processes, which may allow a user to interact freely with user interface instance A 1000 without customization, such as restriction on data output, navigation, or process usage. In other embodiments, user interface instance A 1000 may also be displayed after customization, for example, where customization of the base UI authorizes display of all the elements shown in user interface instance A 1000. User interface instance A 1000 may be displayed in response to capturing media of a user using the device displaying user interface instance A 1000, such as an owner or administrator user of the device that is authorized to view all of the elements of user interface instance A 1000. Therefore, user interface instance A 1000 may include information indicating the detected user, and the user's status with regard to available and/or displayed data in user interface instance A 1000. A status indicator 1002 may show a status of user interface instance A 1000, which is displayed as "unlocked" in response to a user ID indicator 1004 showing known user A detected and identified in currently captured image data (e.g., by a forward facing camera while known user A uses the device displaying user interface instance A 1000).

Since status indicator 1002 is set as unlocked, a navigation bar 1006 may be displayed and usable, while a search bar 1008 may also be accessed and used, for example, to enter input and/or execute a search. Media 1010 may also display an image 1012 recently captured, while a media list 1014 may allow for browsing through additional media. User interface instance A may also allow known user A to interact with one or more processes, which may include options 1016, such as an executable process or task to send media through a send indicator 1018, including image 1012 in media 1010 and/or other media in media list 1014. Moreover, user interface instance A 1000 may allow for selection of other applications and navigation to such applications, which may be done through available selection of application icon 1020 or application icon 1022.

FIG. 2B is an exemplary graphical user interface (GUI) displaying data and processes for a second user that is restricted from viewing certain GUI features and data, according to an embodiment. In contrast to FIG. 2A, environment 200*b* of FIG. 2B includes a user interface instance B 1100 that may be displayed on a communication device, such as communication device 110, where user interface instance B 1100 displays a customized instance or display of a UI after processing based on one or more UI customization parameters, for example, when a UI has restricted or locked data, features, and/or processes of user interface instance B 1100. In this regard, user interface instance B 1100 may be output using those features and processes provided by one or more of user interface customization application 130 and/or service provider application 112 of communication device 110 in environment 100 of FIG. 1.

In user interface instance B 1100, the base UI may be customized and then displayed with only a portion of the associated data, features, and/or executable processes, which may allow a user to interact only with the displayed data, features, and/or executable processes displayed in user interface instance B 1100 with restrictions on data output, navigation, or process usage. User interface instance B 1100 may be displayed in response to capturing media of a guest or unknown user using the device displaying user interface instance B 1100, where the user is not authorized to view or use certain data within user interface instance B 1100. Therefore, user interface instance B 1100 may include information indicating the detected user, and the user's status with regard to available and/or displayed data in user interface instance A 1000. A status indicator 1102 may therefore show that user interface instance B 1100 is locked, where status indicator 1102 is shown and used for user interface instance B 1100 in response to a user ID indicator 1104 showing "unknown" for a user not known or identified in captured media data while the user uses the device associated with user interface instance B 1100.

In response to user ID 1104 associated with an unknown user, user interface instance B 1100 may be customized and/or restricted to prevent unauthorized data viewing, access, and/or use in user interface instance B 1100. Thus a navigation bar 1106 of user interface instance B 1100 is restricted and no longer includes navigation tools to other UIs or within the UI. Similarly, a locked indicator 1108 replaces search bar 1008 of FIG. 2A, so that the user viewing user interface instance B 1100 may not perform searches. The user viewing user interface instance B 1100 may still view the most recently captured media data, including media 1110 having image 1112, which may correspond to media 1010 and image 1012, respectively, of FIG. 2A. Additionally, application icon 1118 and application icon 1120 are shown greyed and crossed out so that application icons 1118 and 1120 may not be interacted with by the user, i.e., inactive, in user interface instance B 1100, and thus the user may not navigate to another UI and/or application from user interface instance B 1100. Since status indicator 1102 of user interface instance B 1100 is "locked," user interface instance B 1100 may include an unlock indicator 1114, where the user viewing user interface instance B 1100 may enter credentials, such as into field 1116, to access one or more of the displayable data and/or processes that are locked or restricted from FIG. 2A.

Figure 3:
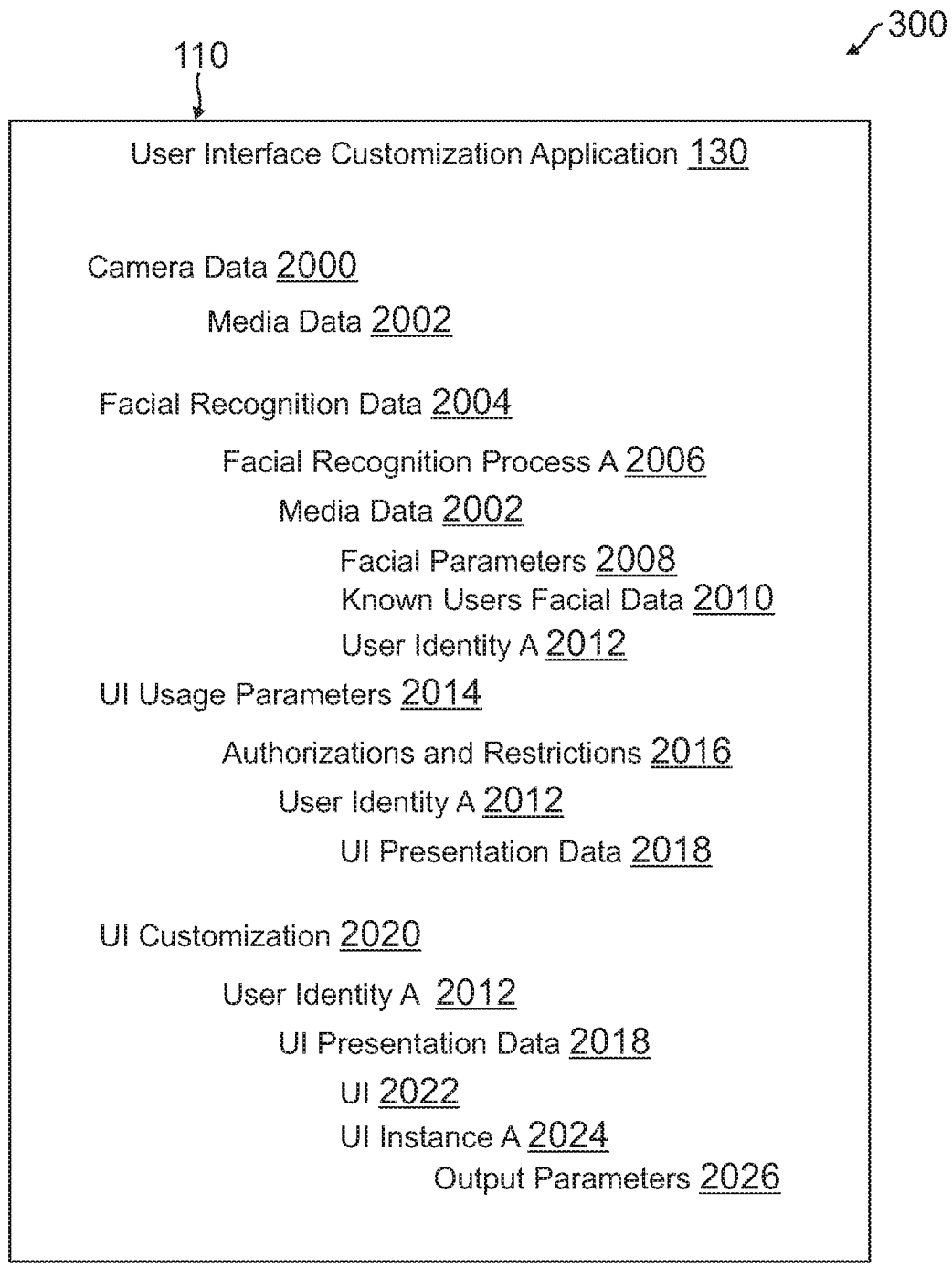
FIG. 3 is an exemplary system environment of a communication device, such as a mobile phone, that determines a display or an instance of a user interface (UI) to output to a user based on media data of the user, according to an embodiment.

FIG. 3 is an exemplary system environment of a communication device, such as a mobile phone, that determines a display or an instance of a user interface (UI) to output to a user based on media data of the user, according to an embodiment. Environment 300 of FIG. 3 includes communication device 110 discussed in reference to system 100 of FIG. 1.

Communication device 110 executes user interface customization application 130 corresponding generally to the specialized hardware and/or software modules and processes described in reference to FIG. 1. In this regard, user interface customization application 130 includes data used determine an identity of a user, and in response to the identity, adjust an instance or display of a general UI so that it is customized to the user's identity. User interface customization application 130 therefore includes camera data 2000 captured during use of communication device 110 by a user, which corresponds to media data 2002 (e.g., an image/video) having a likeness, representation, or portrayal of the user. Media data 2002 may be captured in response to the user attempted to use communication device 110, coming into possession of communication device 110, and/or detected in media data 2002. Facial recognition data 2004 may be extracted from media data 2002 using a facial recognition process A 2006, where identifying points, nodes, or features are extracted as facial parameters 2008, and compared to reference data, such as known users facial data 2010. Using the comparison, a most likely or highest rated comparison may be determined as user identity A 2012, which may also be confirmed by the user or another user/device/server using media data 2002 and/or confirmation requests.

After determination of UI usage parameters, user interface customization application 130 may operate to determine UI usage parameters 2014 that restrict, enable, or change UI output parameters, elements, and/or displays. For example, authorizations and restrictions 2016 may be used with user identity A 2012 to determine UI presentation data 2018, which may correspond to an instance, display, or other configuration of a general UI being displayed (or requested to be displayed) customized depending on user identity A 2012. UI presentation data may then be used for a UI customization 2020 for user identity A 2012, where a UI 2022 may be customized to alter the appearance, output, and/or usability of one or more interface elements based on UI presentation data 2018. Thus, a UI instance A 2024 may be determined having output parameters 2026, which may be output using an output component of communication device 110.

Figure 4:
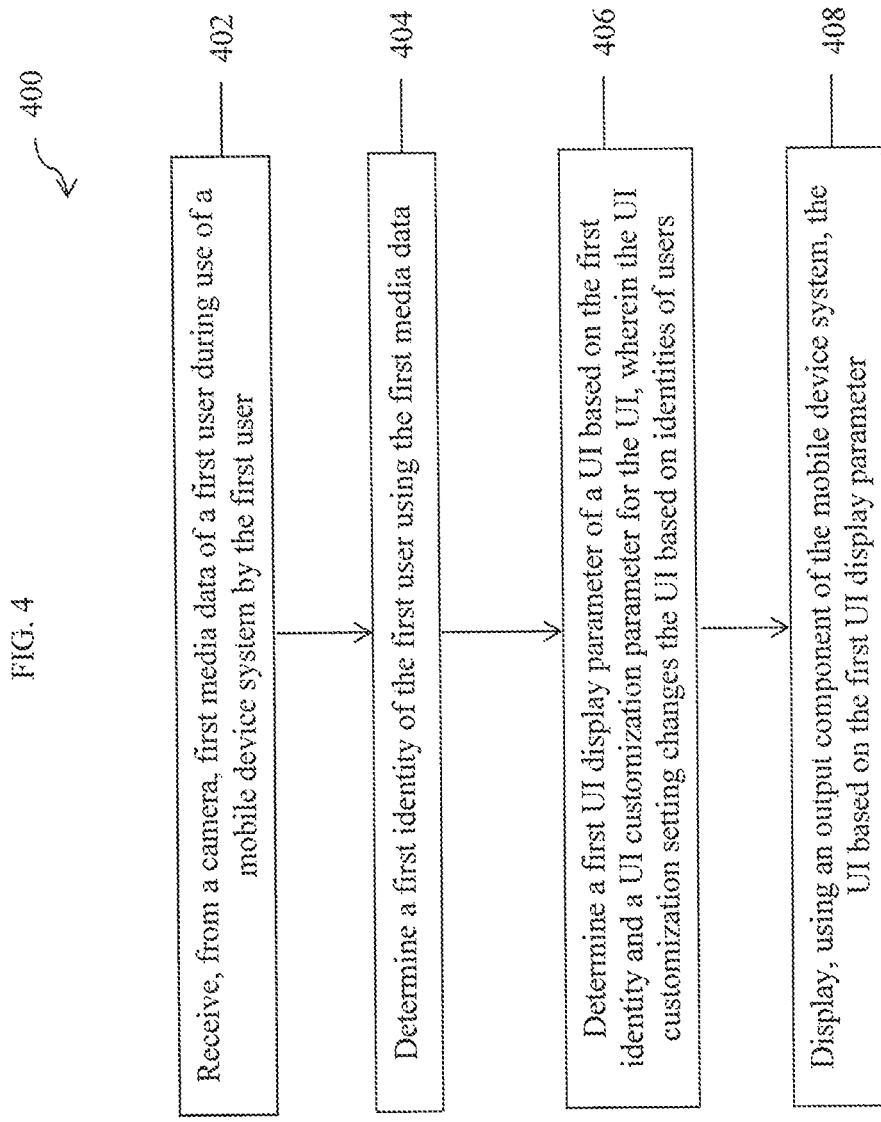
FIG. 4 is a flowchart of an exemplary process for UI customization based on facial recognition, according to an embodiment.

FIG. 4 is a flowchart of an exemplary process for UI customization based on facial recognition, according to an embodiment. Note that one or more steps, processes, and methods described herein may be omitted, performed in a different sequence, or combined as desired or appropriate in flowchart 400 of FIG. 4.

At step 402 of flowchart 400, first media data of a first user is received from a camera during use of a mobile device system by the first user. The first media data captured by the camera may comprise one of image data or video data, wherein the one of the image data or the video data comprises a likeness, representation, or portrayal of the user. In various embodiments, prior to receiving the first media data, a request to establish the UI customization parameter may be received, and configuration media data may be requested. At least an image for one or more of the users associated with the UI customization parameter may be received, one or more of the identities may be determined using the at least the image and a facial recognition processes that extracts identifying facial features in the at least the image, and the identities may be stored with the UI customization parameter. A first identity of the first user is determined using the first media data, at step 404 of flowchart 400. The identity may be determined using facial recognition. The first identity may be determined using an online service provider having user images for registered users, social networking friend images on a social networking service accessible by the mobile device system, contact list data for a contact list application on the mobile device system, or stored images on the mobile device system. The first user may be matched to users in other images, where no matches indicates that the user is an unknown user for purposes of UI customization.

At step 406 of flowchart 400, a first UI display parameter of a UI is determined based on the first identity and a UI customization parameter for the UI, wherein the UI customization setting changes the UI based on identities of users. The first UI customization setting may prevent at least one of navigation away from the UI by the first user or execution of a process through the UI by the first user. It may prevent navigation to an application or another display of the UI, or may prevent navigation to another UI, display of certain data in the UI, or use of a process accessible through the UI. The UI may comprise a graphical user interface (GUI) that outputs data for at least one of an operating system of the device or an application of the device. The first identity may be different from a second identity of a second user that owns the mobile device system, wherein the UI customization parameter restricts the UI during the use by the first user, and wherein the first UI display parameter comprises at least a portion of the UI that is locked based on the UI customization parameter.

Additionally, application data for an application displaying the UI may be received, where the first UI display parameter may be determined based on the application data. The first UI display parameter may also be location specific so that the first UI display parameter, including UI displayable data and UI controls are further displayed, locked, or unlocked based on a current location of the mobile device system. An estimated age of the first user may be determined using the first media data, which may be used to determine the first UI display parameter. The first UI display parameter may further be determined based on security settings for users using the device, wherein the security settings comprise an administrator user setting that allows an owner or an administrator of the device to view all interface data in the UI, and wherein the security settings comprise a guest user setting that limits at least a portion of the interface data to other users than the owner or the administrator, such as the unknown or guest user not matching stored or accessible image data.

Using an output component of the mobile device system, the UI is displayed based on the first UI display parameter, at step 408 of flowchart 400. An authentication credential allowing use of the mobile device system by the first user may be received, and one or more portions of the UI locked by the first UI display parameter may be unlocked. In various embodiments, second media data of a second user is received from the camera after the use of the mobile device system by the first user and a second identity of the second user is determined using the second media data. A second UI display parameter of the UI is determined based on the second identity and the UI customization parameter and the UI displayed on the output component is altered based on the second UI display parameter. The second identity of the second user may comprise an authorized user identity from the identities in the non-transitory memory, wherein the second UI display parameter unlocks a navigation feature of the UI in response to the second identity.

Figure 5:
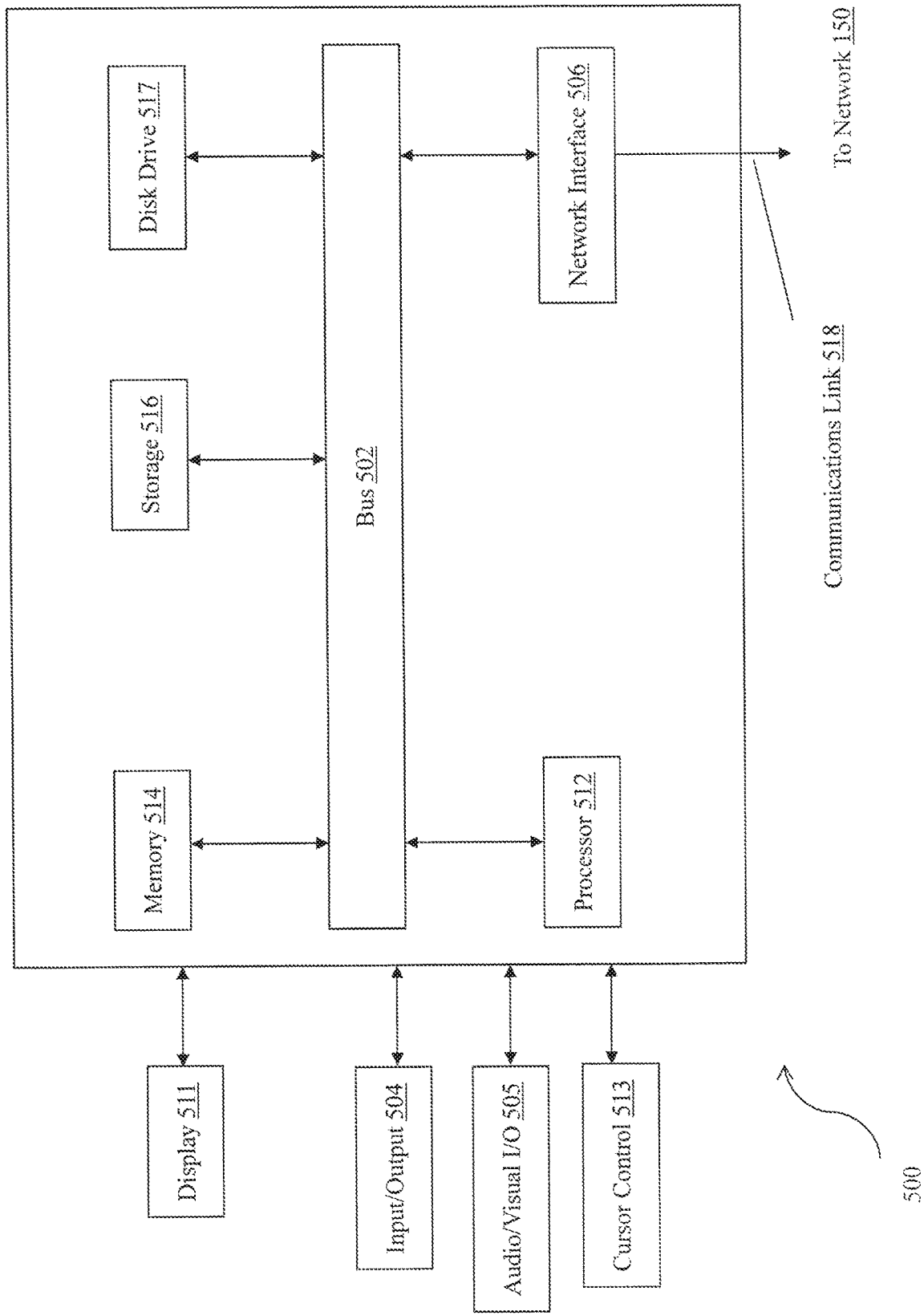
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 150. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A mobile device system comprising:
a camera that captures first media data of a first user;
a non-transitory memory storing user interface (UI) customization settings for a UI, wherein the UI customization settings change the UI based on identities of users; and
one or more hardware processors configured to execute instructions to cause the system to perform operations comprising:
detecting, by the mobile device system, a request to perform an executable process during a use of the mobile device system through the UI of the mobile device system;
determining, by the mobile device system, that the request to perform the executable process through the UI is limited to an authorized set of the identities of the users of the mobile device system;
in response to determining that the request is limited to the authorized set of the identities of the users, receiving, by the mobile device system, from the camera, the first media data of the first user during the use of the mobile device system by the first user;
determining, based on the first media data, audio data associated with the first user during the use of the mobile device system;
determining a location of the mobile device system using a location detection component of the mobile device system;
determining that the location of the mobile device system is associated with a public location having a plurality of users associated with the public location;
determining, by the mobile device system, a first identity of the first user using the first media data and the audio data;
determining, by the mobile device system, a first UI display parameter of the UI based on the first identity, the UI customization settings, and the audio data, wherein the first UI display parameter adjusts access to the executable process through the UI based on the authorized set of the identities of the users, and wherein the first UI display parameter changes an appearance of the UI based on the public location; and
displaying, using an output component of the mobile device system, content associated with the executable process on the UI based on the first UI display parameter.

2. The mobile device system of claim 1, wherein the first media data captured by the camera comprises one of image data or video data, wherein the one of the image data or the video data comprises a representation of the first user, and wherein the determining the first identity uses facial recognition.

3. The mobile device system of claim 1, wherein the UI customization settings prevent an execution of the executable process through the UI by the first user.

4. The mobile device system of claim 1, wherein the UI comprises a graphical user interface (GUI) that outputs data to at least one of an operating system of the mobile device system or an application of the mobile device system.

5. The mobile device system of claim 1, wherein the operations further comprise:
receiving, using the camera, second media data of a second user after the use of the mobile device system by the first user;
determining a second identity of the second user using the second media data;
determining a second UI display parameter of the UI based on the second identity and the UI customization settings; and
altering the content displayed on the UI based on the second UI display parameter.

6. The mobile device system of claim 5, wherein the second identity of the second user comprises an authorized user identity from the identities.

7. The mobile device system of claim 1, wherein prior to the receiving the first media data, the operations further comprise:
receiving a request to establish the UI customization settings;
in response to requesting configuration media data to establish the identities for the UI customization settings, receiving at least an image for one or more of the users associated with the UI customization settings;

determining one or more of the identities using the at least the image and a facial recognition processes that extracts identifying facial features in the at least the image; and storing the one or more of the identities with the UI customization settings.

8. The mobile device system of claim 1, wherein the first identity is determined using an online service provider having user images for registered users, social networking friend images on a social networking service accessible by the mobile device system, contact list data for a contact list application on the mobile device system, or stored images on the mobile device system.

9. The mobile device system of claim 1, wherein the first identity is different from a second identity of a second user that owns the mobile device system, wherein the UI customization settings restrict the executable process through the UI during the use by the first user, and wherein the first UI display parameter comprises at least a portion of the UI that is locked based on the UI customization settings.

10. The mobile device system of claim 9, wherein the operations further comprise:
receiving an authentication credential allowing a use of the mobile device system by the first user; and
unlocking the at least the portion based on the authentication credential.

11. The mobile device system of claim 1, wherein the public location comprises a merchant location, and wherein the first UI display parameter changes the appearance of the UI to hide financial data for a transaction processing application.

12. A method comprising:
detecting, by a device, a request to perform an executable process during a use of the device through a user interface (UI) of the device;
determining, by the device, that the request to perform the executable process through the UI is limited to an authorized set of users of the device;
in response determining that the request is limited to the authorized set of the users, capturing, by the device, an image of a user using a camera of the device;
determining audio data associated with the user during the use of the device;
determining a location of the device using a location detection component of the device;
determining that the location of the device is associated with a public location having a plurality of users associated with the public location;
determining, by the device, user information for the user from the image using image processing of the image, wherein the user information is further determined based on the audio data;
determining, by the device, displayable interface data for the UI that is output by the device using the user information and the audio data, wherein the displayable interface data adjusts UI features output by the device based on the user information and the public location, and wherein the displayable interface data adjusts an access to the executable process through the UI based on the authorized set of users;
generating, by the device, a first instance of a display of the UI using the displayable interface data; and
displaying, using an output component of the device, the UI using the first instance.

13. The method of claim 12, wherein prior to determining the displayable interface data, the method further comprises:
receiving application data for an application executing on the device during the use of the device by the user, wherein the UI and the executable process are associated with the application; and
determining UI displayable data and UI controls required for the UI of the application during the use by the user, wherein the displayable interface data is determined using the UI displayable data and the UI controls required for the UI.

14. The method of claim 12, wherein prior to the determining the displayable interface data, the method further comprises:
determining an estimated age of the user using the user information,
wherein the displayable interface data is determined using the estimated age.

15. The method of claim 12, wherein prior to the determining the user information, the method further comprises:
accessing one or more user images associated with the device,
wherein the user information is determined by matching the image to the one or more user images using facial recognition.

16. The method of claim 15, wherein prior to the determining the user information, the method further comprises:
in response to determining that there is no match between the image and the one or more user images, determining that the user is an unknown user of the device,
wherein the displayable interface data prevents navigation away from the UI to another UI.

17. The method of claim 12, wherein the use of the device is detected through at least one of a motion detection component of the device, a forward facing camera capturing an image or a video of the user, an input to the device, or an authentication request to access the device.

18. The method of claim 12, wherein the displayable interface data is further determined based on security settings for users using the device, wherein the security settings comprise an administrator user setting that allows an owner or an administrator of the device to view all interface data in the UI, and wherein the security settings comprise a guest user setting that limits at least a portion of the interface data to other users than the owner or the administrator.

19. A non-transitory machine-readable medium having stored thereon machine-readable instructions executable to cause a machine to perform operations comprising:
detecting, by a communication device, a request to perform an executable process during a use of the communication device through a user interface (UI) of the communication device;
determining, by the communication device, that the request to perform the executable process through the UI is limited to an authorized set of users of the communication device;
determining audio data associated with a first user during the use of the communication device;
determining a location of the communication device using a location detection component of the communication device;
determining that the location of the communication device is associated with a public location having a plurality of users associated with the public location;
determining, using a camera of the communication device for the first user, that a second user is using the communication device using facial image data of the second user captured by the camera, wherein the second user is further determined to be using the communication device based on the audio data and the plurality of users associated with the public location;

determining, by the communication device based on the second user and the audio data, an interface restriction for a display of the UI on the communication device during the use of the communication device by the second user, wherein the interface restriction adjusts access to the executable process through the UI based on the authorized set of users, and wherein the display of the UI changes an appearance of the UI based on the public location; and displaying, on a display component of the communication device, the UI using the interface restriction.

20. The non-transitory machine-readable medium of claim 19, wherein the determining that the second user is using the communication device comprises:

detecting a change in the facial image data from the first user to the second user, wherein the interface restriction prevents at least one of a first navigation to another display of the UI, a second navigation to another UI, display of certain data in the UI, or a use of a process accessible through the UI.

* * * * *